(12) United States Patent
Rennard

(10) Patent No.: US 9,027,832 B1
(45) Date of Patent: *May 12, 2015

(54) SECOND CHANCE LOTTERY SYSTEM

(71) Applicant: Carl J. Rennard, Lincoln, RI (US)

(72) Inventor: Carl J. Rennard, Lincoln, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,864

(22) Filed: Jun. 12, 2014

Related U.S. Application Data

(63) Continuation-in-part of application No. 14/157,651, filed on Jan. 17, 2014.

(60) Provisional application No. 61/759,609, filed on Feb. 1, 2013.

(51) Int. Cl.
*G06K 5/00* (2006.01)
*G07F 17/32* (2006.01)

(52) U.S. Cl.
CPC .............. *G06K 5/00* (2013.01); *G07F 17/329* (2013.01)

(58) Field of Classification Search
USPC ....................... 235/380, 382; 463/17
See application file for complete search history.

(56) References Cited

U.S. PATENT DOCUMENTS

| 7,802,720 | B2 * | 9/2010 | Yang | 235/380 |
| 7,845,558 | B2 * | 12/2010 | Beemer et al. | 235/462.01 |
| 8,834,251 | B2 * | 9/2014 | Yacenda | 463/17 |
| 2011/0105213 | A1 * | 5/2011 | Irwin et al. | 463/17 |

* cited by examiner

*Primary Examiner* — Seung Lee
(74) *Attorney, Agent, or Firm* — Salter & Michaelson

(57) ABSTRACT

A second chance entry method for a ticket holder to remotely enter at least one ticket identifier by way of a remote input device to a main website that includes a computer-implemented data base. The method includes having the user register at the website; issuing a code card from the website; delivering the code card to the possession of the user; providing the remote input device with a camera for reading codes; scanning the code card at the camera of the input device to verify the authenticity of the user; and scanning at least one ticket by means of the camera of the input device.

21 Claims, 21 Drawing Sheets

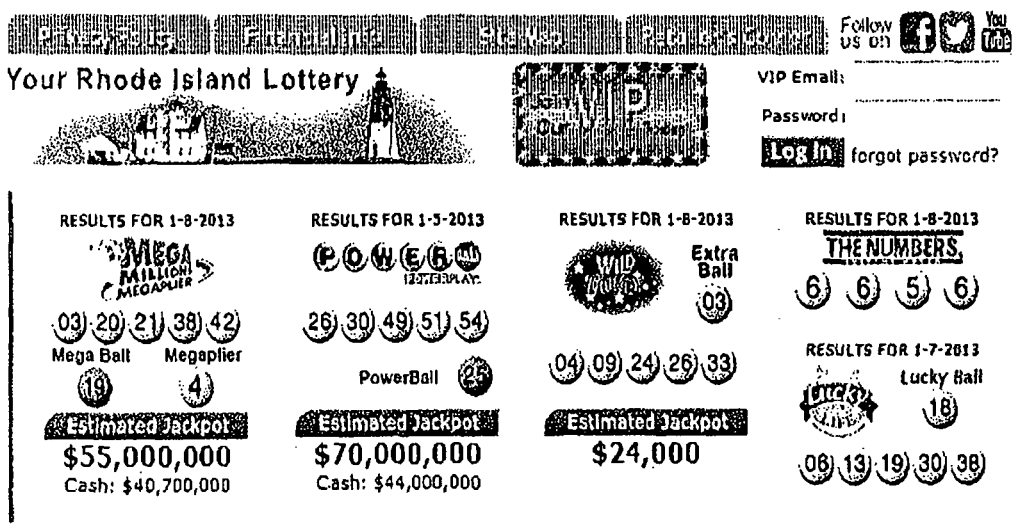
FIG (1)

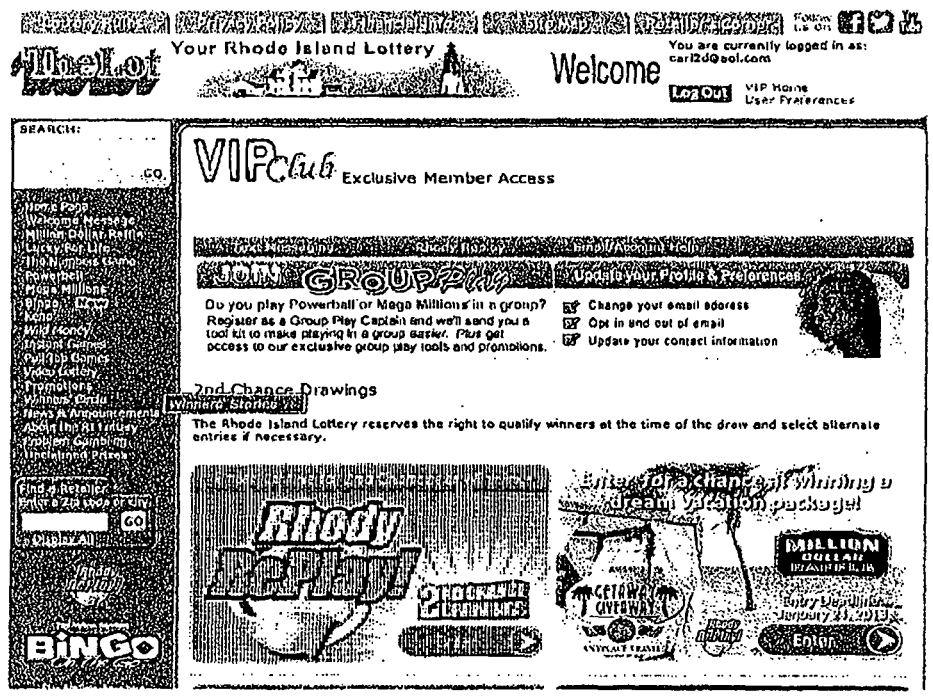
FIG (2)

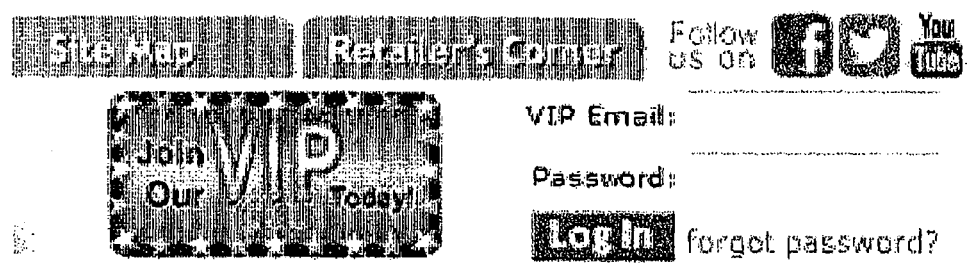
FIG (3)

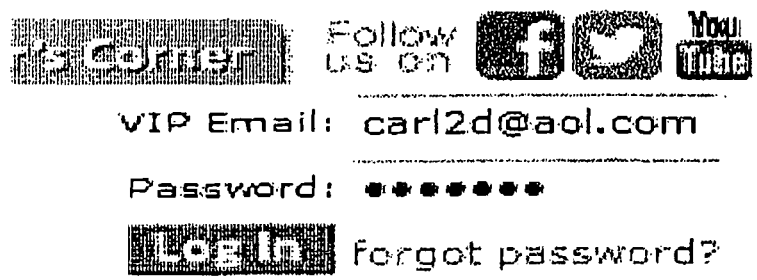
FIG (4)

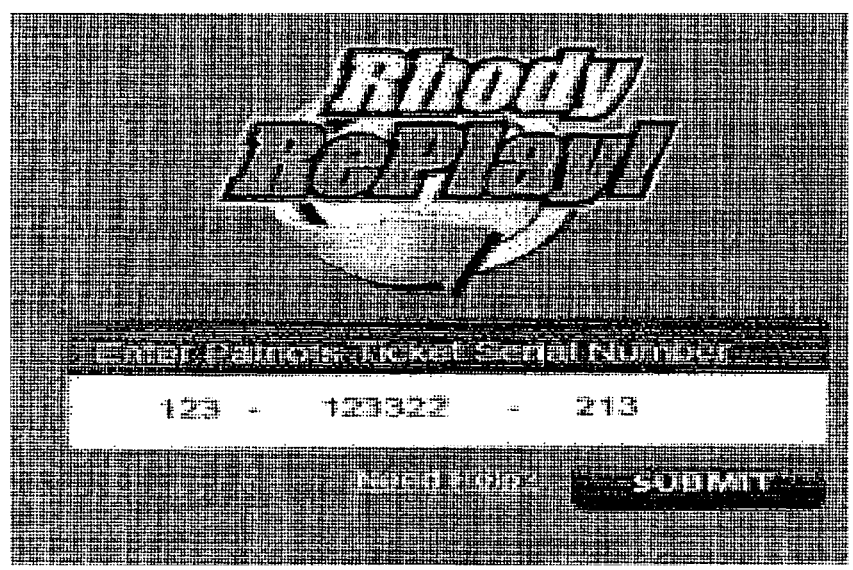
FIG (5)

FIG (6)

Your Rhode Island Lottery
VIP Member
FIG. 7

FIG (8)

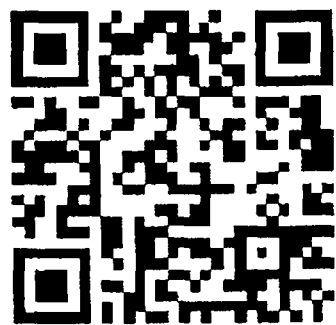
FIG (9)

VIP Registration

Become a Rhode Island Lottery VIP member to enjoy all the benefits and privileges it brings.

VIP's receive the following benefits:

- Exclusive Access to Rhody Replay 2nd Chance Drawings where you can enter tickets to win more great prizes!
- Notification of winning numbers & jackpots from our Daily Numbers, Wild Money, PowerBall® PowerPlay®, Mega Millions® Megaplier®, and Lucky For Life® games.
- Notification of our exclusive VIP Second Chance Drawings where we give-a-way, prizes like Red Sox® tickets, football tickets, basketball tickets, theatre tickets, or other prizes as determined by the Rhode Island Lottery.
- Exclusive access to our Group Play program and web pages.
- You will be among the first to be notified of new games being offered through the Rhode Island Lottery, and be informed of any special promotions and events.
- You will have the opportunity to complete player surveys, where your opinion could help shape future games offered through the Rhode Island Lottery.

If you are 18 years of age or older, please enter the required and requested information below. Once submitted, you will be notified that we received your application. Once you accept by clicking on the link inside the confirmation e-mail we send, you will be an official Rhode Island Lottery VIP member!

The Rhode Island Lottery respects your right to privacy and will not sell, trade, or distribute your personal information unless required to do so by law. When you become a VIP member, you agree to receive occasional promotional e-mail from the Rhode Island Lottery. Please read our Privacy Policy for further information.

I understand that for the purpose of submitting entries into second chance drawings I will access my second chance entry account from within the boundaries of the State of Rhode Island.

* Indicates a required field

Personal Information

* First/Middle/Last Name:
* Gender: Male◯ Female◯
* Address 1:
  Address 2:
* City:
* State: Rhode Island
* Zip:
  Phone Number: Used to Notify Winners
  Phone Number (Alternate): Used to Notify Winners
* Birth Date: Month / Day / Year

VIP Account Info

* E-mail: (This will be your Username)
* Re-Enter E-mail: (For verification)
* Create A Password:
* Re-Enter Your New Password: (For verification)
  (passwords are 5-20 letter/number combo) Example: 57chevy

Fig 10

Winning Numbers & Jackpot Notifications:

Choose optional nightly winning numbers e-mail and/or text message notifications. *By joining, you agree to receive occasional promotional e-mail from the Rhode Island Lottery.*

→ ☑ Send me E-MAIL. Help

Select the below option ONLY if you want to receive text messages to your mobile device. Make sure you select or enter a valid text messaging address. Use the help link to find a provider not in the list.

→ ☐ Send me TEXT messages *(For mobile devices).* Help
   Standard text messaging rates apply. Provider List

| Wireless Cell Phone Number: |
   | Select a cell phone carrier below... |

Enable or Disable e-mail or text messages at any time by logging into your VIP account and updating your User Preferences. To completely stop all e-mail, you must Delete your VIP account from the User Preferences page.

Tell Us More

* How did you find our site?
   ○ TV
   ○ Radio
   ○ Billboard
   ○ Lottery Pamphlet/Signage
   ○ Internet Link
   ○ Internet Search Engine
   ○ Lottery Retailer
   ○ Friend
   ○ Other

Fig 11

* Which of the following games do you play? Check all that apply:

☐ Bingo
   ☐ Instant Tickets
   ☐ Raffle
   ☐ Keno
   ☐ Keno Plus
   ☐ Multi Chance Keno
   ☐ PowerBall®
   ☐ PowerBall® with PowerPlay
   ☐ Numbers
   ☐ Numbers Instant Match
   ☐ Mega Millions®
   ☐ Mega Millions With Megaplier®
   ☐ Wild Money
   ☐ Lucky For Life
   ☐ Video Lottery at Lincoln
   ☐ Video Lottery at Newport.
   ☐ Lottery Games Outside of Rhode Island.
   ☐ I Do Not or Rarely Ever Play

* Which Instant Scratch ticket amounts do you typically purchase? Check all that apply:

☐ $1.00
   ☐ $2.00
   ☐ $3.00
   ☐ $5.00
   ☐ $7.00
   ☐ $10.00
   ☐ $20.00
   ☐ I Do Not Play Instant Games.

Confirm Signup

SECOND CHANCE LOTTERY SYSTEM

RELATED CASES

This application is a continuation-in-part (CIP) of U.S. Ser. No. 14/157,651 filed on Jan. 17, 2014 and which claims priority under 35 U.S.C. §119(e) to U.S. Provisional Patent Application No. 61/759,609 which was filed on Feb. 1, 2013 and each of which is incorporated by reference herein in its entirety.

FIELD OF THE INVENTION

The present invention relates to an improved second chance lottery system more particularly to a method of remotely entering ticket identification information from one or more tickets in a second chance system.

BACKGROUND OF THE INVENTION

Lottery tickets for many states have the ability to be entered into a second chance pool. On the back of a ticket there is typically a way to enter the losing ticket into a second chance game to win another prize by entering the tickets serial number at the state lotteries web site. However one has to first register with the state lottery system. This typically starts with the name, address, email and a password. After that one would use the email and password anytime to submit any more tickets in the second chance prize lottery.

After being registered one could now log onto the State lottery website. However, to submit new tickets one had to log onto the VIP area. This required the email and password. Once in the VIP area one had to select the second chance field. Then one needed to select the second chance game. After selecting the game the screen refreshed and one could then manually enter the 17 or more digit serial number of the ticket. If one had any more tickets to enter they had to follow the same procedure, and manually enter the multi-digit serial number for each ticket. Needless to say this process took several minutes and is frustrating, and if one happens to put in the wrong number they would not even know as it is possible the number typed in was a legitimate ticket number just not the one that was in hand.

Accordingly, it is an object of the present invention to provide a far more simplified system for the entry of ticket identification information such as the serial number of each ticket. In this connection it is noted that the barcode on the ticket had incorporated the serial number in the ticket barcode. Accordingly, and based on the information already being on the ticket, the present invention has been developed in order to more easily process second chance tickets for the customer. In accordance with the present invention the method and system is faster in operation, more convenient in use and is characterized by total accuracy.

SUMMARY OF THE INVENTION

To accomplish the foregoing and other objects, features and advantages of the present invention there is provided a second chance entry method for a ticket holder to remotely enter at least one ticket identifier by way of a remote input device to a main website that includes a computer-implemented data base. The method comprises the steps of:
having the user register at the website;
issuing a code card from the website;
delivering the code card to the possession of the user;
providing the remote input device with a camera for reading codes;
scanning the code card at the camera of the input device to verify the authenticity of the user; and
scanning at least one ticket by means of the camera of the input device.

In accordance with other aspects of the present invention the user is registered by entering a user name and password; the user name and password are stored at the website data base; the code card carries a predetermined code; the predetermined code is one of a barcode, QR code, data matrix code, RFID/NFC (radio Frequency ID/Near Field Communication) and magnetic stripe embedded technologies; optionally issuing a code card in the form of credit card size card; issuing a code card in the form of a key fob card; or issuing a code card in the form of a pre-printed QR application code; wherein the delivering of the code card to the possession of the user is by mailing the code card to the user; wherein the step of providing the remote input device with a camera for reading codes includes providing the input device as one of a laptop computer, a kiosk tablet, home desktop computer, personal tablet, or "smart" phone; wherein, for a kiosk tablet, the user also has to enter their user name and password at the remote input device; including the user having to enter at the remote input device a multi digit personal identification number; wherein the step of the scanning of the ticket includes scanning each different ticket in succession at the camera of the input device; and wherein the code card has a unique code stored at the data base and corresponding to a unique user entry code.

In accordance with the present invention there is also provided a second chance ticket entry system for a ticket holder and user to remotely enter at least one ticket identifier comprising:
a main website that includes a data base for storing user identification data;
a code card issued from the website;
a remote input device that communicates with the main website;
the code card being delivered to the possession of the user;
the remote input device including a camera for reading codes;
the user scanning the code card at the camera of the input device to verify the authenticity of the user; and
the user then scanning at least one ticket by means of the camera of the input device.

In accordance with still other aspects of the present invention the user is registered by entering a user name and password, and wherein the user name and password are stored at the website data base; the code card carries a predetermined code, and wherein the predetermined code is one of a barcode, QR code, data matrix code, RFID/NFC (radio Frequency ID/Near Field Communication) and magnetic stripe embedded technologies; the code card is in the form of one of a credit card size card, a key fob card, and a pre-printed QR application code card; the remote input device includes one of a laptop computer, a kiosk tablet, home desktop computer, personal tablet, or "smart" phone; and each different ticket in succession at the camera of the input device is scanned, and wherein the code card has a unique code stored at the data base and corresponding to a unique user entry code.

In accordance with the present invention there are also other aspects that can be incorporated in to the system. One such feature is the use of biometric verification to identify the user. This may be in the form of a specific user body verification or a unique identifier for the user using, for example, fingerprint verification or facial recognition. Another possible verification can be based on the iris of the human eye.

DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which:

FIG. 1 is a screen capture of a state lottery web site;

FIG. 2 is a screen capture of what is referred to as a "VIP" area of the website;

FIG. 3 shows the entering of a user ID typically the users email address;

FIG. 4 shows a user selected password that allows easy entry to the website registration area;

FIG. 5 is a diagram where the player can opt for a menu ranging from available game offerings, to immediately selecting the registration of second chance game tickets;

FIG. 6 illustrates the entering of data for every ticket of any and all games;

FIG. 7 illustrates a VIP player code card that may be made of plastic and similar to the card stock of a credit or ID card;

FIG. 8 is a smaller code card in the form of a key fob;

FIG. 9 is a code card in the form of a pre-printed QR application code;

FIG. 10 shows registration steps for lottery system;

FIG. 11 shows further registration steps for lottery system;

FIG. 19 illustrates a more complete display at the kiosk including the lottery welcome screen and prompt for sign in;

DETAILED DESCRIPTION

Research has been conducted with respect to lottery systems that offer second chance games. The conclusion of the research brought forward some interesting results with many similarities listed below.

1) Nearly every state that offers a scratch off instant lottery ticket also offers a second chance entry program within that states lottery web site.

2) Every state that offers a second chance game requires the user to login first with their registered email address and password.

3) Each state lottery web site offers the same process to enter a losing scratch ticket into their second chance lottery.

4) Nearly all-instant scratch game tickets had some type of barcode.

5) Each state lottery web site had a FAQ section within the second chance entry page.

With respect to these second chance games and the web site each states second chance FAQ's typically had the following most popular questions:

1) What do I do if I forget my password?

2) What do I do if I enter the wrong serial number from the ticket?

3) What if I enter the ticket serial number and the site tells me the number has already been entered.

The conclusions for all the above issues were based on human error. Therefore, the method and system of the present invention was devised and set out to provide a system and method that would provide the following.

1) Speed the customer login process.

2) Eliminate or minimize the need for customer data entry.

3) Increase speed and accuracy of ticket serial number entry.

4) A process that would work on all the popular OS platforms. Windows, Mac Ios, and Android Accordingly, the present invention proposes an application utilizing current barcode technology, or like code technology. A barcode contains the customer Login and Password information. This requires no data entry on the customer's part. The system of the present invention allows the state website to accept scanning of the ticket barcode containing ticket serial number and other pertinent information required by the state to process the ticket. The serial number of each ticket can be separately entered by simply scanning each ticket barcode.

The present invention is represented by the attached FIGS. 1-15 that are described in more detail in the following text. The concepts can apply to a number of different environments such as:

1) Custom software application for Smart phone environments, to allow the user to login to State sponsored lottery web site VIP area using QR code Technology.

2) Custom software application for tablet pc environments, to allow the user to login to State sponsored lottery web site VIP area using QR code Technology.

3) Custom software application to allow scanning of ticket barcode into the states second chance lottery web site/database.

4) Allow process to bypass game selection process and provide for customer to just scan access VIP code and then scan or process game ticket barcodes.

Figure 15:
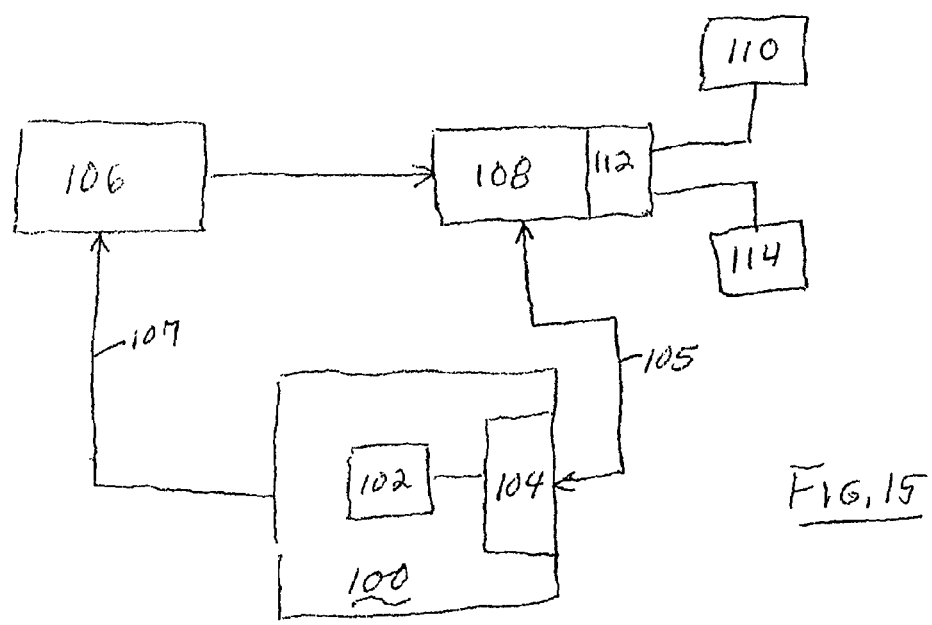
FIG. 15 is a simple block diagram of the computer implementation of the system and method of the present invention.

In accordance with the present invention there is provided a second chance entry method for a ticket holder to remotely enter at least one ticket identifier by way of a remote input device to a main website that includes a computer-implemented data base. Refer now to the block diagram of FIG. 15 for an illustration of the main components of the system and method of the present invention. This includes a main website 100 that includes a data base 102 for storing user identification data and an interface 104 that may be in the form of an input/output device that may include hardware and software means. FIG. 15 also shows the user at 106 and a remote input device 108 that communicates with the interface 104 of the main website 100 by way of communication line 105. A code card 110 issued from the website indicated in FIG. 15 by the line 107 that represents a delivery of the code card 110 to the user 106. The code card 110 may be mailed to the user 106 or delivered in another way including electronic delivery to the user and remote input device 108. Thus, in one embodiment of the present invention the code card is delivered to the possession of the user. FIG. 15 also shows a remote input device 108 including a camera 112 for reading codes. The user scans the code card 110 at the camera 112 of the input device 108 to verify the authenticity of the user. The user then scans at least one ticket 114 by means of the camera 112 of the input device 108.

In accordance with the related method of the present invention there are the steps of having the user register at the website 100; issuing a code card 110 from the website; delivering the code card to the possession of the user 106; providing the remote input device 108 with a camera 112 for reading codes; scanning the code card 110 at the camera 112 of the input device 108 to verify the authenticity of the user 106; and scanning at least one ticket 114 by means of the camera 112 of the input device 108.

In accordance with still other aspects of the present invention the user 106 is registered by entering a user name and password, and wherein the user name and password are stored at the website data base 100. The code card carries a predetermined code, and wherein the predetermined code is one of a barcode, QR code, data matrix code, RFID/NFC (radio Frequency ID/Near Field Communication) and magnetic stripe embedded technologies. The code card 110 is may be in the form of a credit card size card, a key fob card, or a pre-printed QR application code card. The remote input device 108 may be comprised of a laptop computer, a kiosk tablet, home desktop computer, personal tablet, or "smart" phone. Each different ticket 114 in succession at the camera 112 of the input device 108 is scanned. The code card 110 has a unique code stored at the data base 102 and corresponding to a unique user entry code.

In accordance with other aspects of the present invention the user is registered by entering a user name and password. The user name and password are stored at the website data base 102. The code card carries a predetermined code. The predetermined code is one of a barcode, QR code, data matrix code, RFID/NFC (radio Frequency ID/Near Field Communication) and magnetic stripe embedded technologies; optionally issuing a code card 110 in the form of credit card size card; issuing a code card in the form of a key fob card; or issuing a code card in the form of a pre-printed QR application code; wherein the delivering of the code card 110 to the possession of the user 106 is by mailing the code card to the user; wherein the step of providing the remote input device with a camera 112 for reading codes includes providing the input device 108 as one of a laptop computer, a kiosk tablet, home desktop computer, personal tablet, or "smart" phone. For a kiosk tablet, the user also has to enter their user name and password at the remote input device 108; including the user having to enter at the remote input device a multi digit personal identification number. The step of the scanning of the ticket includes scanning each different ticket in succession at the camera of the input device; and wherein the code card has a unique code stored at the data base and corresponding to a unique user entry code.

The Second Chance System (SCS) may be embodied in, for example, a Kiosk Tablet program that will utilize proprietary software in its unique application. It has been developed to address the current, difficult, manual registration "technology" game players are subjected to use in order to gain entry into the second chance game pools. It will conform to today's standard hardware and operating systems including Windows, Mac, and Android. The goal is to make second chance game pool registration simple, fast, attractive and universal to allow all segments of the lottery playing population easy entry to game registration. There is nothing like it in the marketplace today. The following are more detailed descriptions relating to the attached figures.

For the Kiosk application it is preferred that the user enter their email and password every time. On the other hand it may not be necessary to enter that information when the remote input device is a smart phone or personal PDA. The system may still need to verify the identity with a 4 digit PIN number. A PC or notebook may use the full login credentials. However, if the PC or notebook is equipped with a web camera with a minimum 5 mega pixel camera, then the player could then scan their VIP card to log in and scan to enter the second chance tickets just like the kiosk in the retail environment.

FIG. 1 is a screen capture of a state lottery web site. FIG. 2 is a screen capture of what some states call their "VIP" area. The player or user 106 will be able to seamlessly login using a proposed lottery retailer supplied "Kiosk Tablet", home desktop computer, laptop, personal tablet, or "smart" phone. Entering a user ID FIG. 3 (typically the users email address) followed by a user selected password (FIG. 4) will allow easy entry to the registration area.

Passwords are created by the player during a one time sign up process and are stored on state lottery data bases. FIGS. 10 and 11 illustrate the registration steps that are common in most states and governmental lottery systems and programs domestically and internationally. The registration steps are common practice in most state and governmental lottery systems and programs domestically and internationally. The manual requirement of entering the second chance registration of tickets is also a common phenomenon. After personal information for the player has been sent to the lottery data base 102 it will notify the player that he is now able to access and enter into the lottery VIP area through the use of his personal password (FIG. 3). In this VIP area of FIG. 2 the player can opt for a menu ranging from available game offerings, to immediately selecting the registration of second chance game tickets. Refer to FIG. 5.

The huge advantage and attraction to the player is that the SCS process will streamline the laborious, manual, data entry inputs now currently demanded for registration. It will not only automate the entry steps presently required but fly by wasteful "hunt and peck" installation of ticket serial numbers that can reach as many as twenty four digits before acceptance. See FIG. 6. This entering of data is for every ticket of any and all games. The elimination of the human error factor will also be inherent in the operation.

By utilizing a combination of its software applications (proprietary QR code algorithm) and hardware integration the SCS methodology will be speedy, user friendly for all players and mistake free. Technically savvy players will have no advantage over less inclined players due to the introduction of a truly level field for all. In the first phase of the SCS program after lottery compliance has been approved the player will receive a package mailed to the address given on the submitted application. This will contain a VIP player card (FIG. 7) made of plastic and similar to the card stock, (same size and feel) of a typical credit or ID card. The card will contain a QR code FIG. 7 with the players encoded login information and commands. In some states and jurisdictions there may be, for additional security, the addition of a 4 digit PIN personal identification number. Stored in the lottery database this PIN is not encoded into the QR code.

The second card will be a smaller key fob (FIG. 8) attachment for easy use at lottery retailers similar to loyalty cards distributed by major drug, grocery and big box stores everywhere. And also contain a QR code (FIG. 8) with the players encoded login information and commands.

The third enclosure or code card may be a pre-printed QR application code (FIG. 9) in which the player can take a camera snapshot and have the lottery web site electronically downloaded automatically to his personal media equipment. Additionally this can be done at a lottery retail site if the player does not have access to the aforementioned media equipment. He is now ready to go. The cards may be mailed to the registered user via postal services and the cross promotional opportunities are endless.

Figure 12:
FIG. 12 shows the use of a verification code on the front of the game ticket.
Figure 13:
FIG. 13 shows as additional verification code (data matrix code) called a (Vern code) under a protective latex covering that may be required to be scratched of in order to scan or manually enter said code.
Figure 14:
FIG. 14 is an illustration that the code can be in the form of a QR or PDF code.

When a player wants to register as a VIP member for a second chance game at the lottery retailer kiosk, the player accesses the lottery website (FIG. 1) then by placing the VIP card in front of the camera 112 field of view and scanning their VIP card 110 with the QR code (FIG. 7) the SCS custom algorithm. Recognizing that the card is not currently associated with any current lottery member in the database, the system immediately brings the player to the VIP lottery registration page of the website (FIGS. 10 and 11). Upon completion of the registration process, the VIP card (FIG. 6) and key fob (FIG. 7) is now functional and the player may utilize the kiosk from that point forward to scan and quick entry his or her second chance tickets and any state sponsored lottery kiosk. This camera 112 in the kiosk will be activated for use in scanning and registering the ticket(s) serial number (s) (FIG. 6) for that game. Since every game has a distinct information field associated in its barcode, the system will automatically enter the tickets into the correct prize pool. In some jurisdictions the player may be asked to enter a verification code on the front of the game ticket (FIG. 12). This code is an additional verification code called a (Vern code) is sometimes under (FIG. 13) a protective latex covering and requires to be scratched of in order to scan or manually enter said code. The code can be in the form of a QR or Data matrix code (FIG. 13) or PDF code portable data file (FIG. 14).

At the retail Kiosk the proposed player involvement would be:

1) Screen always shows the lottery web site. FIG. (1).
2) Player touches screen, is brought to sign in area where welcomed by name and internal camera pops up.
3) Player then simply scans personal ID/FOB card FIGS. (7&8) which has all information conveniently imbedded in the QR code supplied. Screen can automatically default to second chance registration area of web site (FIG. 5).
4) Once identified the player then begins scanning serial numbers for all tickets (FIG. 6) to be registered for the $2^{nd}$ chance games applicable. (No further selection is necessary since all games are recognized by the system via the bar codes being captured by the camera 112).
5) System will verify and display each ticket 114 as it is entered into the system.
6) Player is then asked if he is finished and if "yes" simply touches "yes" and lottery screen says "Good Luck" and "Come Again". Player is logged out.
7) Should the player not be in possession of his ID/FOB card a button will enable the accessing of a virtual keyboard for manual entry of user ID/PASSWORD. After verification of password the camera returns to screen and process from that point is identical to above.

The NFC/RFID technology is a little different as it relies on a passive RFID tag/chip embedded within the VIP card and encoded with our custom algorithm. It also requires a specialized NFC/RFID reader be supported by the kiosk, and would replace on the functionality of reading the VIP card and not the ticket barcodes.

Reference is now made to further aspects of the present invention as illustrated in FIGS. 16-21. With the advent and acceptance of biometric and face recognition technology it is now possible to have other verification techniques used in the system of the present invention. Biometric scanners such as a finger print scanner represent a technology that is now incorporated in the VIP Player registration process. This technology is incorporated into many of today's smart phones and tablets for finger print security using software technologies. This software embed in the OS of many of today's current devices allows the user to have access to their personal device by scanning and verifying the true owners finger print. This print is stored on the device and enabled by the user during the initial purchase/setup process.

Figure 16:
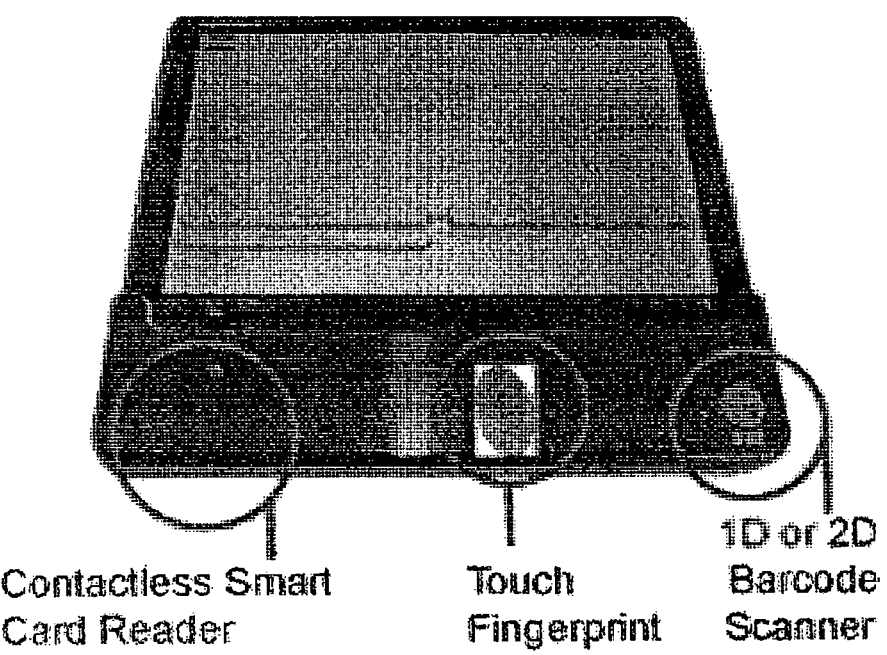
FIG. 16 illustrates a device used for verification including a reader, fingerprint sensor and 1D or 2D barcode scanner.
Figure 17:
FIG. 17 illustrates in particular the touch pad for finger print verification.
Figure 18:
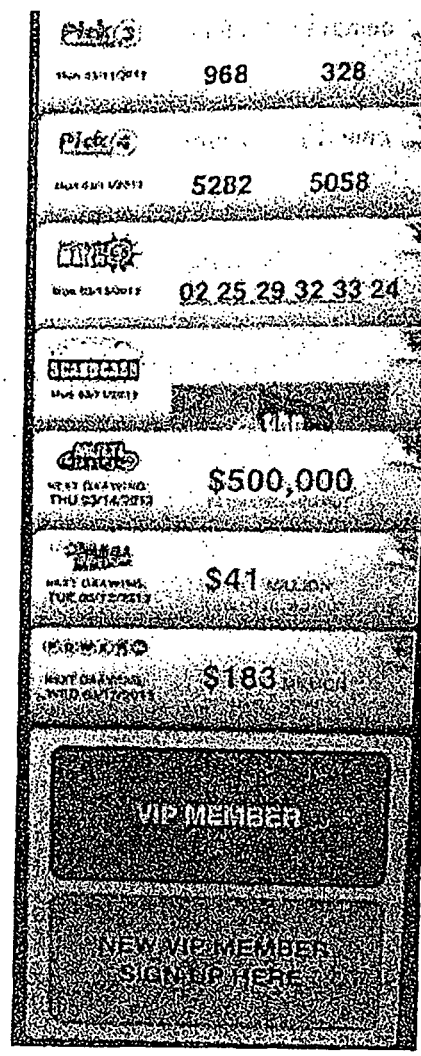
FIG. 18 show a portion of the kiosk display for new member registration.

In accordance with the present invention the digital algorithm of the users finger print is stored on the device much the same way they would enter a PIN code to unlock the device. In the VIP lottery Second Chance Systems Lottery Application the process would be as follows:

1) At the Lottery retailer kiosk Location, the user would select the new member registration button provided on the Lottery retailer kiosk. See FIG. 18. During the registration process the system will ask if they wish to enroll their finger print as an additional security method of logging into the system and thereby bypassing the need for the use of a user email and password for verification. FIGS. 16 and 17 illustrate a finger print hardware configuration. FIG. 16 illustrates a device used for verification including a reader, fingerprint sensor and 1D or 2D barcode scanner; FIG. 17 illustrates in particular the touch pad for finger print verification;

How Will it Work?

1: The VIP player will simply activate the Lottery Kiosk by a touch of the screen. The system will display the lottery welcome screen and prompt the player to sign in. (FIG. 1).

2: The VIP player will scan their lottery VIP card (FIG. 7) and then be prompted to enter a password (FIG. 4) or bio scan their finger print (FIG. 17) to complete the player verification process.

3: If they have chosen, during the registration process, to utilize the biometric sign in process, the player will select the BIO-Sign in Button. (FIG. 16).

4: The player simply places their finger at or on the designated attached Biometric device. (FIG. 16) The System will read the finger print and compare (as it would if using an email and password) to the finger print that was stored during the registration process stored on the lottery database.

5: When complete and player is acknowledged the player is allowed access to the lottery options offered within the lottery system.

6: From this point forward During the VIP sign in process the system, once the system has scanned the VIP player card, will then activate the biometric fingerprint scanner for verification. When verification is complete the player is allowed access to lottery options offered within the lottery system.

Another development in accordance with the present invention and that can be instituted into the program will be facial recognition. Facial recognition software has been designed for verification and identification. These programs use a variety of algorithms to measure the uniqueness of a person's facial features. These algorithms convert the features into a digital sequence unique to that persons photo image and can be stored as such in a database such as a finger print or any other unique identifier for an individual.

How biometric facial recognition will work in the second chance lottery process is as follows.

Figure 19:
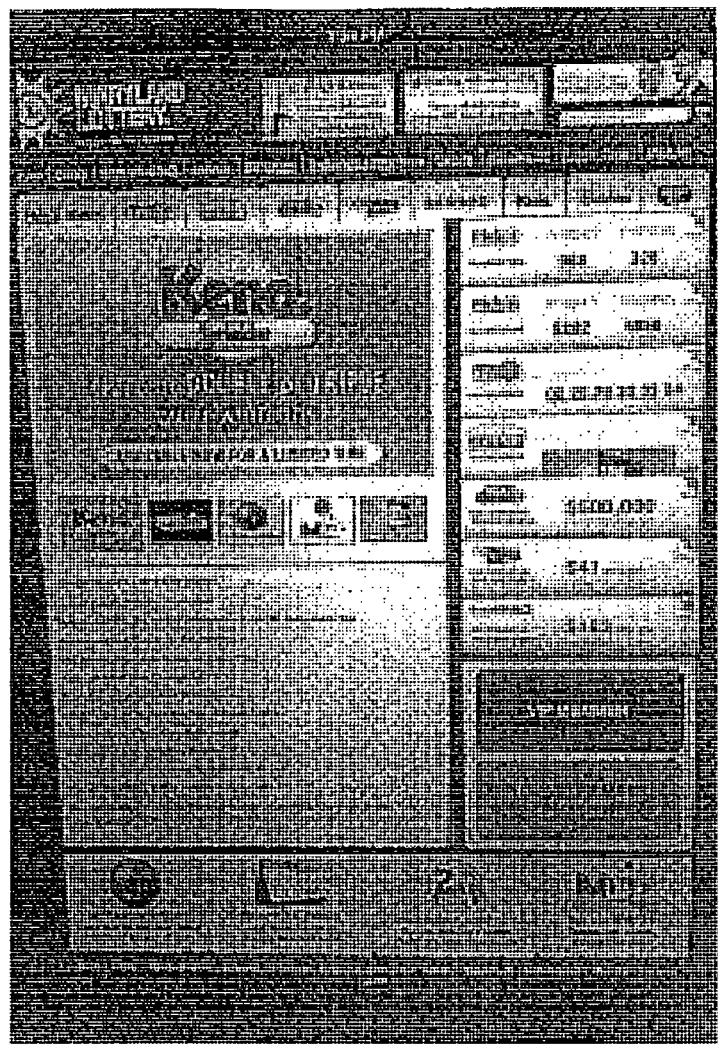
Figure 20:
FIG. 20 illustrates the a display related to an algorithm for facial recognition software.
Figure 21:
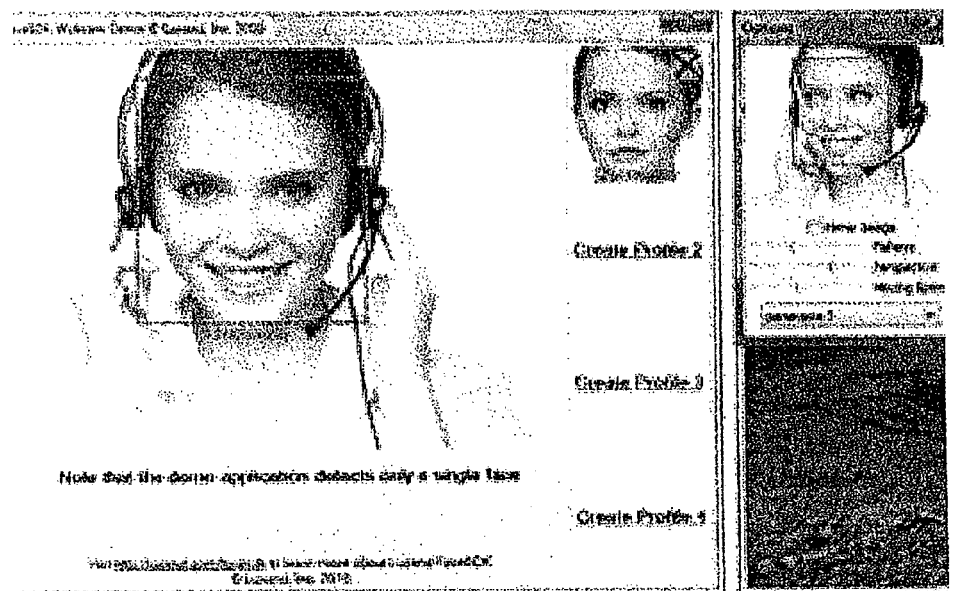
FIG. 21 illustrates a person's photo image.

1) At the Lottery retailer kiosk Location (FIG. 19) the user would select the new user registration button provided on the Lottery retailer kiosk. (FIG. 1). During the registration process the system will ask if they wish to enroll their digital photograph as an additional security method of logging into the system and thereby bypassing the need for the use of a user email and password for verification. FIGS. 20 and 21 illustrates a system matching process. FIG. 20 illustrates a display related to an algorithm for facial recognition software; and FIG. 21 illustrates a person's photo image.

How Will it Work?

1: The VIP player will simply activate the Lottery Kiosk by a touch of the screen. The system will display the lottery welcome screen and prompt the player to sign in. (FIG. 19).

2: The VIP player will scan their lottery VIP card (FIG. 7) and then be prompted to enter the Lottery required registration information, along with the player email and a password (FIG. 4).

3: The player will then be asked if they wish to participate in the optional Photo recognition process for verification.

4: IF "yes" the system will take a photo of the player (FIG. 21). The Systems then, using facial recognition software, uses algorithms (FIG. 20) to convert the features into a digital sequence unique to that persons Photo image (FIG. 21). This Digital information is then stored in the lottery database alongside other player registration information.

5: At this point the player can complete the registration process.

6: When complete and the player is acknowledged, the player is allowed access to the lottery options offered within the lottery system.

7: From this point forward During the VIP sign in process the system, once the system has scanned the VIP player card, will then activate the facial recognition software for verification. When verification is complete the player is allowed access to lottery options offered within the lottery system.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A second chance entry method for a ticket holder to remotely enter at least one ticket identifier by way of a remote input device to a main website that includes a computer-implemented data base, said method comprising the steps of:
   having the user register at the main website;
   issuing a code card from the main website;
   delivering the code card to the possession of the user;
   providing the remote input device with a camera for reading codes;
   scanning the code card at the camera of the remote input device to verify the authenticity of the user; and
   scanning at least one ticket by means of the camera of the remote input device.

2. The method of claim 1 wherein the user is registered by either entering a user name and password or by a biometric verification technique.

3. The method of claim 2 wherein the user name and password are stored at the website data base or the biometric verification is by one of finger print verification or facial recognition.

4. The method of claim 1 wherein the code card carries a predetermined code.

5. The method of claim 4 wherein the predetermined code is one of a barcode, QR code, data matrix code, RFID/NFC (radio Frequency ID/Near Field Communication) and magnetic stripe embedded technologies.

6. The method of claim 1 including issuing a code card in the form of a credit card size card.

7. The method of claim 1 including issuing a code card in the form of a key fob card.

8. The method of claim 1 including issuing a code card in the form of a pre-printed QR application code card.

9. The method of claim 1 wherein the delivering of the code card to the possession of the user is by mailing the code card to the user.

10. The method of claim 1 wherein the step of providing the remote input device with a camera for reading codes includes providing the remote input device as one of a laptop computer, a kiosk tablet, home desktop computer, personal tablet, or "smart" phone.

11. The method of claim 10 wherein, for a kiosk tablet, the user also has to enter their user name and password at the remote input device.

12. The method of claim 11 including the user having to enter at the remote input device a multi digit personal identification number.

13. The method of claim 1 wherein the step of the scanning of the ticket includes scanning each different ticket in succession at the camera of the remote input device.

14. The method of claim 1 wherein the code card has a unique code stored at the data base and corresponding to a unique user entry code.

15. A second chance ticket entry system for a ticket holder and user to remotely enter at least one ticket identifier comprising:
   a main website that includes a data base for storing user identification data;
   a code card issued from the main website;
   a remote input device that communicates with the main website;
   the remote input device including a camera for reading codes;
   the user scanning the code card at the camera of the remote input device to verify the authenticity of the user; and
   the user then scanning at least one ticket by means of the camera of the remote input device.

16. The system of claim 15 wherein the user is registered by entering a user name and password, and wherein the user name and password are stored at the main website data base, or registration is by means of biometric verification.

17. The system of claim 15 wherein the code card carries a predetermined code, and wherein the predetermined code is one of a barcode, QR code, data matrix code, RFID/NFC (radio Frequency ID/Near Field Communication) and magnetic stripe embedded technologies.

18. The system of claim 15 wherein the code card is in the form of one of a credit card size card, a key fob card, and a pre-printed QR application code card.

19. The system of claim 15 wherein the remote input device includes one of a laptop computer, a kiosk tablet, home desktop computer, personal tablet, or "smart" phone.

20. The system of claim 15 wherein each different ticket in succession at the camera of the remote input device is scanned, and wherein the code card has a unique code stored at the data base of the main website and corresponding to a unique user entry code.

21. The system of claim 15 wherein the user is registered by means of biometric verification including by one of finger print verification and facial recognition.

* * * * *